(12) United States Patent
Tuschner et al.

(10) Patent No.: US 9,575,939 B2
(45) Date of Patent: Feb. 21, 2017

(54) LINKED CODE GENERATION REPORT

(75) Inventors: Kai Tuschner, Leinfelden-Echterdingen (DE); William Aldrich, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 1189 days.

(21) Appl. No.: 12/946,354

(22) Filed: Nov. 15, 2010

(65) Prior Publication Data

US 2011/0060980 A1    Mar. 10, 2011

Related U.S. Application Data

(63) Continuation of application No. 10/057,126, filed on Oct. 25, 2001, now Pat. No. 7,849,394.

(51) Int. Cl.
*G06F 17/00* (2006.01)
*G06F 17/22* (2006.01)

(52) U.S. Cl.
CPC ....... *G06F 17/2241* (2013.01); *G06F 17/2264* (2013.01)

(58) Field of Classification Search
CPC .................. G06F 17/2241; G06F 17/2264
USPC ......................................... 715/201, 209, 210
See application file for complete search history.

(56) References Cited

U.S. PATENT DOCUMENTS

| | | |
|---|---|---|
| 4,901,221 A | 2/1990 | Kodosky et al. |
| 5,966,532 A | 10/1999 | McDonald et al. |
| 5,978,818 A | 11/1999 | Lin |
| 6,049,835 A | 4/2000 | Gagnon |
| 6,122,647 A | 9/2000 | Horowitz et al. |
| 6,219,628 B1 | 4/2001 | Kodosky et al. |
| 6,269,475 B1 | 7/2001 | Farrell et al. |
| 6,389,481 B1 | 5/2002 | Malcolm |
| 6,493,740 B1 | 12/2002 | Lomax |
| 6,675,370 B1 | 1/2004 | Sundaresan |
| 6,792,418 B1 | 9/2004 | Binnig et al. |
| 6,961,686 B2 | 11/2005 | Kodosky et al. |
| 6,993,708 B1 | 1/2006 | Gillig |
| 7,099,809 B2 | 8/2006 | Dori |
| 7,114,149 B2 | 9/2006 | Aptus et al. |
| 7,392,469 B1 | 6/2008 | Bailin |
| 2002/0016206 A1 | 2/2002 | Yoshimi et al. |
| 2002/0029231 A1* | 3/2002 | Aptus et al. .................. 707/513 |
| 2002/0038206 A1* | 3/2002 | Dori .............................. 703/22 |
| 2002/0054138 A1 | 5/2002 | Hennum |
| 2002/0055891 A1 | 5/2002 | Yang |
| 2002/0072049 A1 | 6/2002 | Prahalad |
| 2002/0078010 A1 | 6/2002 | Ehrman et al. |
| 2002/0083413 A1 | 6/2002 | Kodosky et al. |
| 2002/0091681 A1* | 7/2002 | Cras et al. ........................ 707/3 |
| 2002/0099852 A1 | 7/2002 | Fischer |
| 2002/0129058 A1 | 9/2002 | Story et al. |
| 2002/0161783 A1* | 10/2002 | Kroeger ....................... 707/200 |
| 2002/0170048 A1 | 11/2002 | Zgarba et al. |
| 2002/0188928 A1 | 12/2002 | Szpak et al. |
| 2003/0016206 A1 | 1/2003 | Taitel |
| 2003/0018953 A1 | 1/2003 | Aberg |

(Continued)

*Primary Examiner* — Stephen Hong
*Assistant Examiner* — Marshon Robinson
(74) *Attorney, Agent, or Firm* — Nelson Mullins Riley & Scarborough LLP (57) ABSTRACT

A method includes generating source code corresponding to a block diagram model and generating hypertext links associating elements of the generated source code with elements of the block diagram model.

15 Claims, 5 Drawing Sheets

(56) References Cited

U.S. PATENT DOCUMENTS

| | | |
|---|---|---|
| 2003/0037312 A1 | 2/2003 | Czech |
| 2003/0069908 A1 | 4/2003 | Anthony et al. |
| 2003/0107595 A1 | 6/2003 | Ciolfi |
| 2003/0120549 A1 | 6/2003 | Lindner |
| 2003/0137522 A1 | 7/2003 | Kaasila et al. |
| 2003/0195732 A1* | 10/2003 | Kodosky et al. ............ 703/2 |
| 2004/0031015 A1 | 2/2004 | Ben-Romdhane et al. |
| 2007/0288885 A1 | 12/2007 | Brunel et al. |

* cited by examiner

```
Block:
 209       /* Switch: '<Root>/Switch' incorporates:
 207        *   Logic: '<Root>/Logical Operator'
 204        *   RelationalOperator: '<Root>/Relational Operator1'
 203        *   Constant: '<Root>/Constant'
input2      *   Inport: '<Root>/In2'
 206        *   RelationalOperator: '<Root>/Relational Operator'
 205        *   Constant: '<Root>/Constant1'
 202        *   Lookup: '<Root>/Look-Up Table'
 201        *   Gain: '<Root>/Gain'
input1      *   Inport: '<Root>/In1'
 208        *   Lookup2D: '<S1>/Look-Up Table (2-D)'
input3      *   Inport: '<Root>/In3'
input4      *   Inport: '<Root>/In4'
            *
            * Regarding '<Root>/Gain':
 201        *   Gain value: 2.0
            */
```

FIG. 5

LINKED CODE GENERATION REPORT

RELATED APPLICATION

The present application is a continuation of, and claims priority to, U.S. patent application Ser. No. 10/057,126, filed on Oct. 25, 2001. The contents of the aforementioned application is incorporated herein by reference.

TECHNICAL FIELD

This invention relates to linked code generation reports.

BACKGROUND

Data representation and modeling are an integral part of working with dynamic real-world systems such as electrical circuits, shock absorbers, braking systems, and many other electrical, mechanical and thermodynamic systems. These systems may be modeled, simulated and analyzed on a computer system using block diagram modeling. Block diagram modeling graphically depicts mathematical relationships among a system's inputs, states, parameters, and outputs, typically through the use of a graphical user interface (GUI). Block diagram modeling also graphically depicts time-dependent mathematical relationships among a system's inputs, states and outputs, typically for display on the GUI.

Block diagram modeling may involve automatic code generation, a process whereby software source code is automatically produced from a block diagram model of a dynamic system. The software source code produced by the automatic code generation process may be compiled and executed on a target processor, implementing the functionality specified by the model.

It is common for the code generated by an automatic code generator to include explanatory comments. Typically, such comments act as headers to generated functions or data structures, and provide an indication of how those functions or data structures logically relate to the block diagram model.

SUMMARY

According to one aspect of the invention, a method includes generating source code corresponding to a block diagram model, and generating hypertext links associating elements of the generated source code with elements of the block diagram model.

One or more of the following features may also be included. The method may further include displaying the source code and hypertext links on a display, receiving input from a user representing the selection of one of the hypertext links, and displaying to the user at least a portion of the block diagram model including an element of the model associated with the hypertext link. Displaying may include displaying the associated element in a highlighted fashion.

At least one of the associated elements in the generated source code may be a commented reference to a block in the block diagram model. At least one of the associated elements in the generated source code may be a variable reference in an operative code section. The hypertext link may be Standard Generalized Markup Language (SGML) or Hypertext Markup Language (HTML). The hypertext language may be Extensible Markup Language (XML). The commented reference to a block may include a character string identifying a path to a file providing information relating to the sections of the block.

According to another aspect of the invention, a system includes means for generating source code corresponding to a block diagram model and means for generating hypertext links associating elements of the generated source code with elements of the block diagram model.

One or more of the following features may also be included. The system may further include means for displaying the source code and hypertext links on a display, means for receiving input from a user representing the selection of one of the hypertext links, and means for displaying to the user at least a portion of the block diagram model including an element of the model associated with the hypertext link. The means for displaying to the user at least a portion of the block diagram model may include displaying the associated element in a highlighted fashion. At least one of the associated elements in the generated source code may be a commented reference to a block in the block diagram model. At least one of the associated elements in the generated source code may be a variable reference in an operative code section. The hypertext link may be Standard Generalized Markup Language (SGML) or Hypertext Markup Language (HTML). The hypertext language may be Extensible Markup Language (XML). The commented reference to a block may include a character string identifying a path to a file providing information relating to the sections of the block.

Embodiments may have one or more of the following advantages.

The system provides easy access and direct navigation from a syntax-highlighted code generation report to a block in a block diagram model. The use of the syntax-highlighted code generation report enables the user to directly view and access blocks in a block diagram model from their corresponding source code within a browser's window while at the same time allowing the user to modify, reconfigure, and view other relevant data pertaining to the blocks under analysis as the block is being viewed. Moreover, in addition to the ease of instant navigation, the traceability of the source code back to the corresponding block increases efficiency in data modeling, processing, and analysis, and is beneficial in increasing accuracy of results and minimizing analytical human error.

The syntax-highlighted code generation report provides increased efficiency and operation in terms of the usage, storage, and management of information. Information about a particular dynamic system is quickly and efficiently accessed as well as managed and stored in an efficient manner.

The syntax-highlighted code generation report enables a user to efficiently control the information related to the data to be used with a block-based design environment, as opposed to having to exit, enter, re-enter, close or open new viewing windows to access source code information about the block. This facilitates a seamless transfer and view of information from the source code to the block-based design environment, enabling users to have a location with all the information required for analyzing and studying a block diagram model and/or system. Moreover, this reduces the redundancy, inconsistency and errors associated with having multiple sources of access to the source code. In addition, the ability to easily and quickly link the block to the source code makes it possible for users to reliably work without interruption, reducing inconsistency and redundancy.

Syntax-highlighted code generation reports simplify the task of defining, viewing, and modifying data associated with the block.

The source code accessed from the syntax-highlighted code generation report is available throughout the block-based design environment and is propagated to all stages of the process.

Other features, objects, and advantages of the invention will be apparent from the description and drawings, and from the claims.

DETAILED DESCRIPTION

Figure 1:
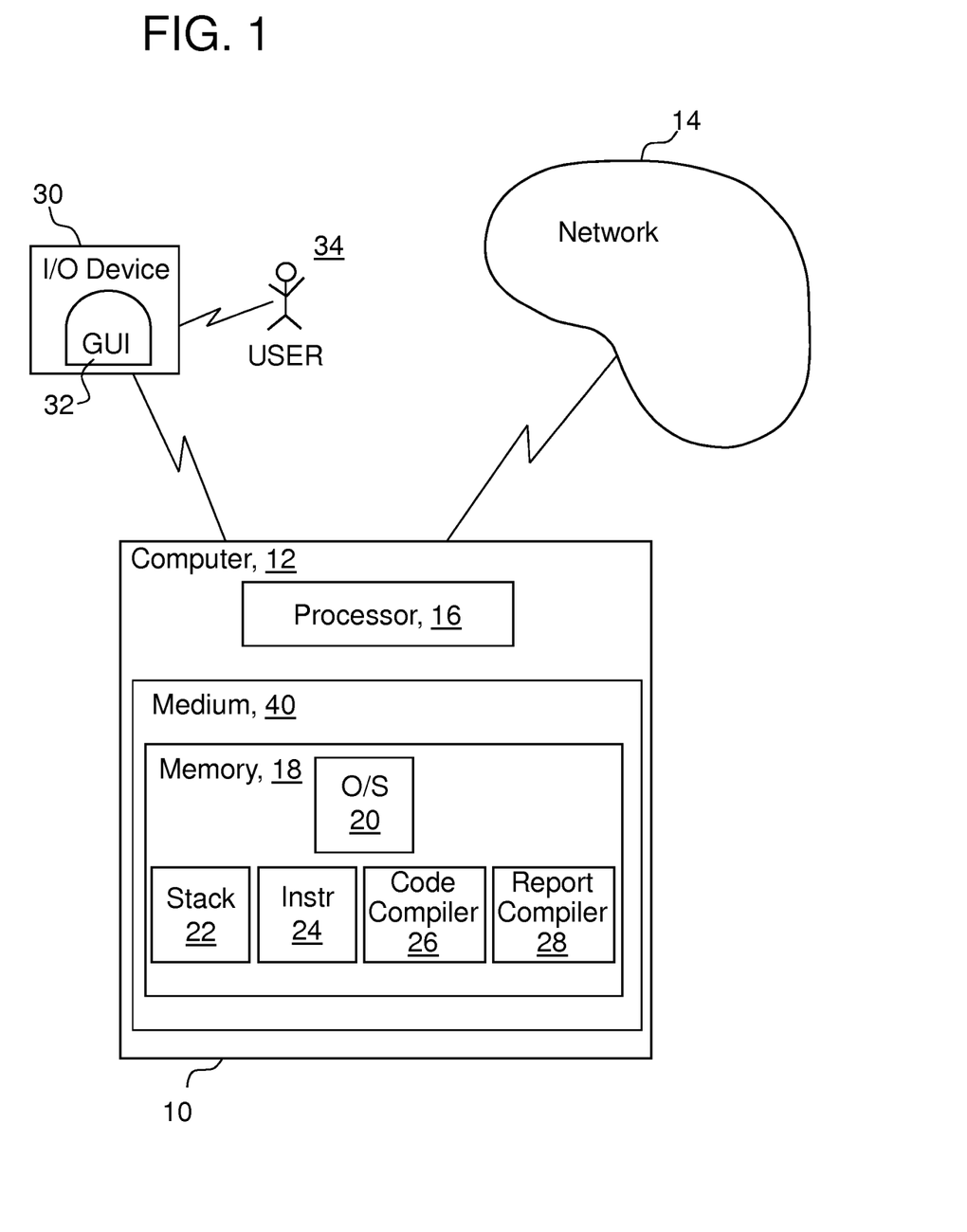
FIG. 1 is a block diagram of a code generation report generating system.

FIG. 1 shows a processing system 10. The processing system 10 includes a computer 12, such as a personal computer (PC). Computer 12 is connected to a network 14, such as the Internet, that runs TCP/IP (Transmission Control Protocol/Internet Protocol) or another suitable protocol. Connections may be via Ethernet, wireless link, telephone line, and the like.

Computer 12 contains a processor 16 and a memory 18. Memory 18 stores an operating system ("OS") 20 such as Windows980 or Linux, a TCP/IP protocol stack 22 for communicating over network 14, and machine-executable instructions 24 executed by processor 16 to perform linked code generation report process 100 below. The memory 18 a so includes a code compiler 26 and a report compiler 28. Computer 12 also includes an input/output (I/O) device 30 for display of a graphical user interface (GUI) 32 to a user 34.

Figure 2:
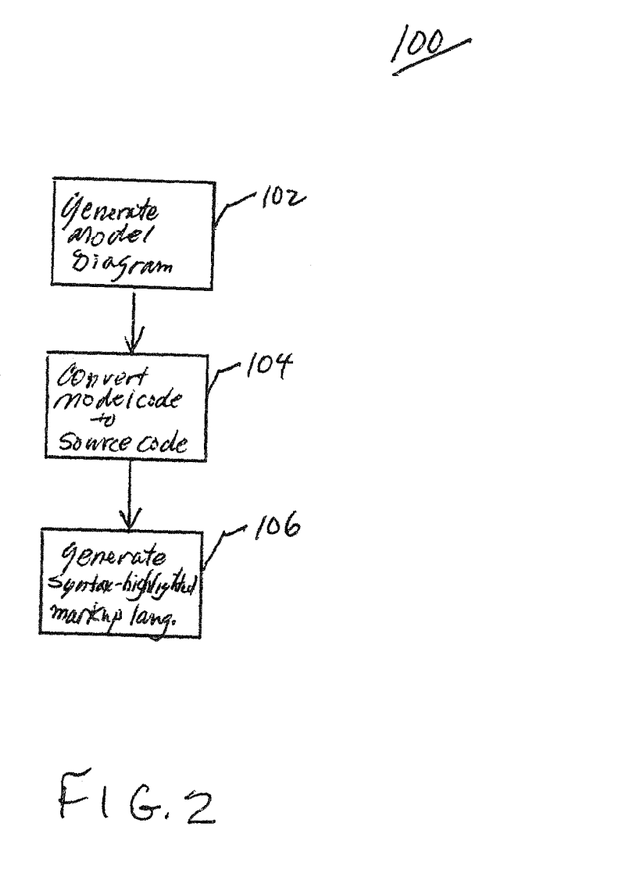
FIG. 2 is a flow diagram of the link code generation report process of FIG. 1.

Referring to FIG. 2, the linked code generation report process 100 includes generating (102) a model diagram. The model diagram represents a dynamic system to be simulated and is displayed to the user 34 on the GUI 32 of the input/output device 30.

The model diagram is specified by the user 34 and represented by a source model language such as, for example, SimulinkCo from The Mathworks, Inc. of Natick, Mass., incorporated herein by reference. The process 100 converts (104) in the code compiler 26 the source model language into program source code in a technique generally referred to as code generation. Code generation is a technique whereby software, i.e., program source code such as C, Ada, Basic and Java®, is automatically produced from the source model language representing by the model diagram. The software source code produced may be compiled and then executed on a target processor, implementing the functionality of the specified model diagram.

An example automatic code generator is Real Time Workshop@Embedded Coder from The Mathworks, Inc. of Natick, Mass., incorporated herein by reference.

The process 100 generates (106) using the report compiler 28 a markup language document, generally referred to as a code generation report, that contains information about the source model language, settings of the code generator and the generated program source code in syntax highlighted form.

Each part of the generated program source code is translated by the report compiler 28 and saved into its own markup language file. The markup language file is generally referred to as a syntax-highlighted code generation report.

The generated markup language files contain hyperlinks to the source model language representing the model diagram and allow the user 34 to navigate from the markup language file to the source model language and the block it represents in the model diagram. This provides the user 34 with an ability to identify a block that corresponds to selected code fragments in the generated program source code.

A hyperlink is a selectable connection from one word, picture, or information object to another. In a multimedia environment such as the World Wide Web, such objects can include sound and motion video sequences. The most common form of link is the highlighted word or picture that can be selected by the user (with a mouse or in some other fashion), resulting in the immediate delivery and view of another file. The highlighted object is referred to as an anchor. The anchor reference and the object referred to constitute a hyperlink.

Figure 3:
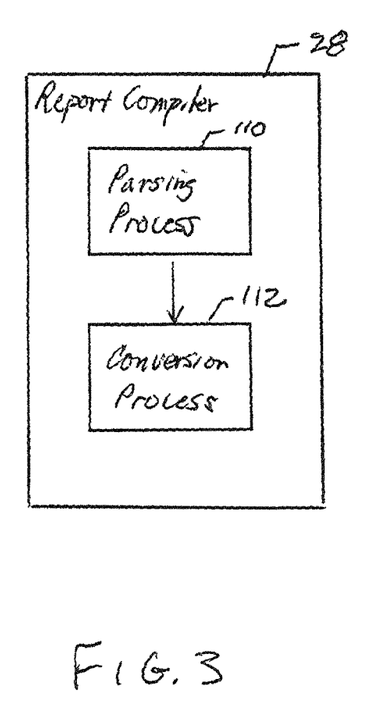
FIG. 3 is a diagram of the report compiler of FIG. 1.

Referring to FIG. 3, the report compiler 28 includes a parsing process 110 and a software source code markup language conversion process 112. The parsing process 110 analyzes the generated software source code and replaces listed block references in the comment sections with links that refer back to the corresponding sections within the source model language representing the blocks of the model diagram. The software source code to markup language conversion process 112 converts the generated software source code to the syntax highlighted markup language code generation report.

Figure 4:
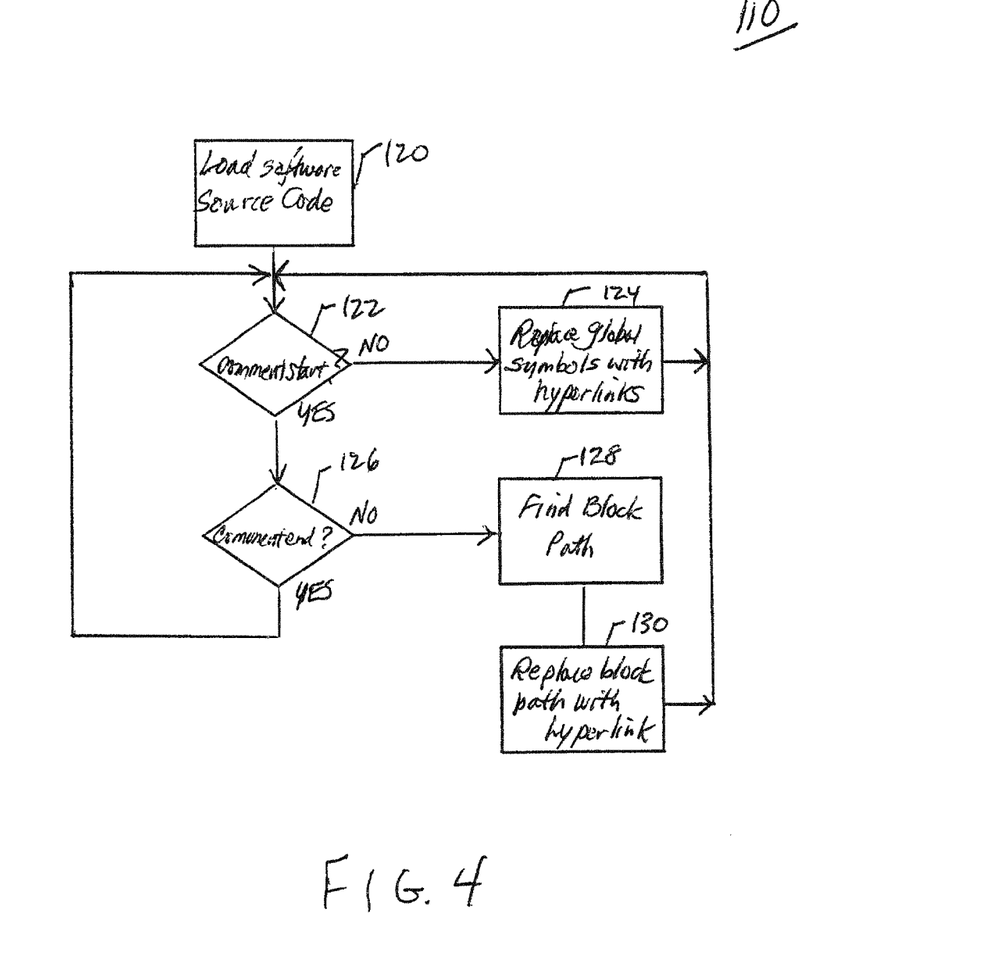
FIG. 4 is a flow diagram of the parsing process of FIG. 3.

The parsing process 110 is best understood by using a C source code example. Referring to FIG. 4, the parsing process 110 includes loading (120) the C program source code into memory 18. For each line of C program code, process 110 determines (122) whether the parser is at the start of a comment line. In the C language, a comment begins with the special symbols "\*". If no comment start is detected, the process 110 replaces (124) global symbol names with hyperlinks and may color keywords according to the syntax. If a comment start is detected, the process 110 determines (126) whether a comment end is detected. In the C language, a comment ends with the special symbols "\". If no comment end is detected, the process 110 finds (128) a block path within the comment by applying a multiple pattern match. If a block path is detected, the process 110 replaces (130) the block path with a special hyperlink back to the model diagram. This special hyperlink contains a command that highlights the references block, like the following example:

<A href="execute:highight_system model/Block_A">model/BlockA</A>

The above command may be executed if the user 34 selects the hyperlink, and the user 34 has a browser capable of executing the command in the model diagram environment.

Figure 5:
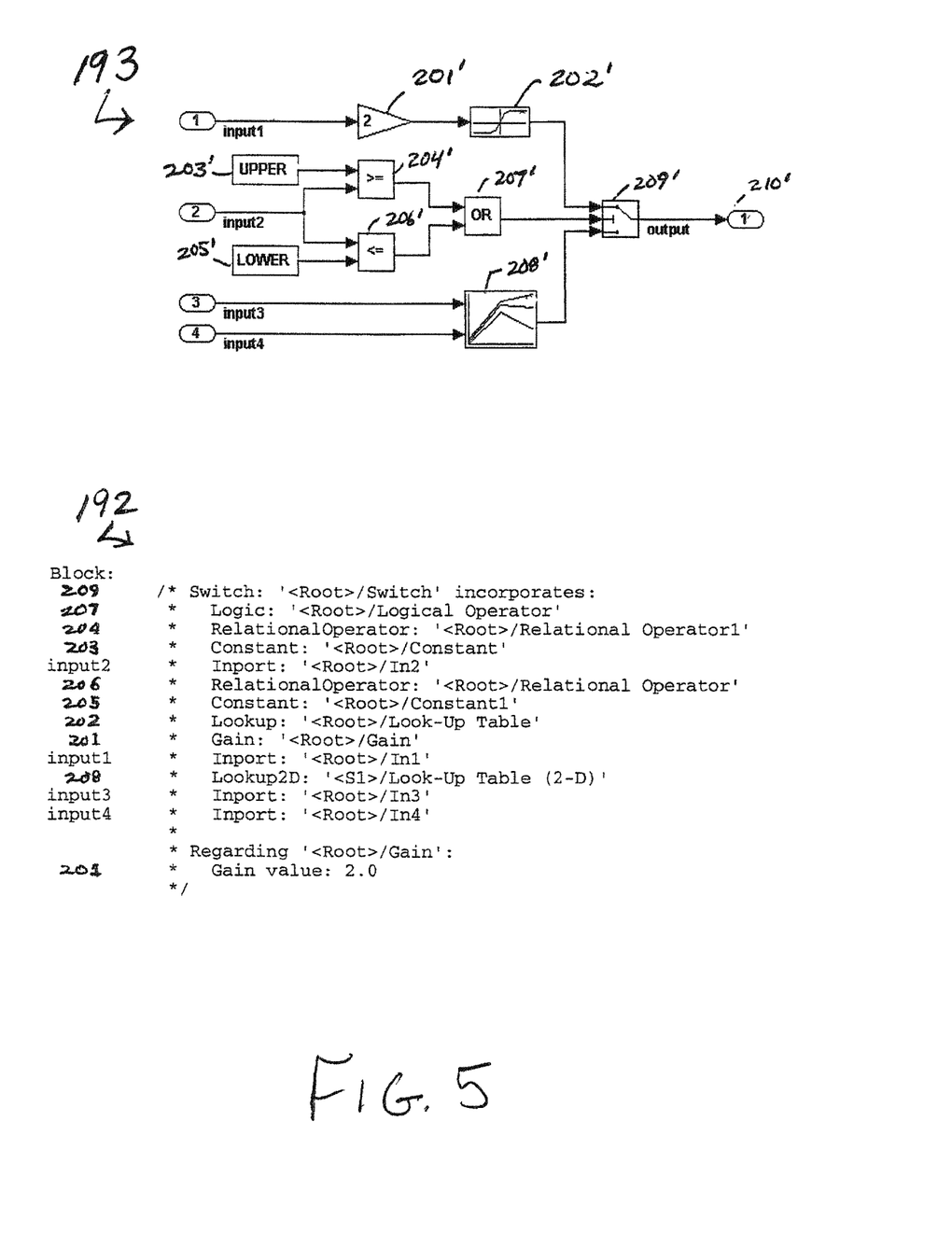
FIG. 5 illustrates an exemplary model diagram and associated syntax highlighted code generation report.

Referring to FIG. 5, an exemplary model diagram 190 and associated syntax highlighted code generation report 192 are shown. The hyperlinks in the report 192 are numbered to illustrate their correspondence to the blocks of the model diagram 193. For example, 202 in the report 192 is a hyperlink to the gain block 202' in model diagram 190.

Further aspects, features and advantages will become apparent from the following claims.

What is claimed is:

1. An electronic device implemented method comprising:

accessing, using a processor, source code in a second language generated from a source model representation of a block diagram model where:
   the block diagram model is provided in a modeling environment for simulation of a represented dynamic system,
   the source model representation of the block diagram model is in a first language, the second language is distinct from the first language,
   the source code implements functionality specified by the block diagram model,
   the second language is a textual programming language,
   the source code includes one or more comments, and
   the one or more comments provide information identifying a corresponding element in the block diagram model; and generating a code generation report from the source code, the generating of the code generation report comprising:
   including the source code in the code generation report;
   parsing the one or more comments in the source code to identify the information, and
   replacing the information in the comment in the source code in the code generation report with a hyperlink relating to the corresponding element, the hyperlink comprising an anchor and a reference to a corresponding element in the block diagram model, the hyperlink enabling direct navigation to the corresponding element in the block diagram model from the code generation report when the hyperlink is selected.

2. The method of claim 1 further comprising:
receiving input representing a selection of the at least one hyperlink; and
displaying a portion of the block diagram model including the corresponding element of the block diagram model identified by the information.

3. The method of claim 2, wherein the displaying a portion of the block diagram model comprises displaying the identified element in a highlighted fashion.

4. The method of claim 1, wherein the parsing comprises:
replacing a variable reference in the code with a hyperlink to an associated element in the block diagram model.

5. The method of claim 1 wherein the hyperlink is provided in Standard Generalized Markup Language (SGML).

6. The method of claim 1 wherein the hyperlink is provided in Hypertext Markup Language (HTML).

7. The method of claim 1 wherein the hyperlink is provided in Extensible Markup Language (XML).

8. The method of claim 1 wherein the one or more comments comprise a character string identifying a path to a file providing information relating to a section of the corresponding element.

9. A non-transitory computer readable medium having instructions stored thereon, the instructions comprising:
one or more instructions that, when executed by a processor, cause the processor to:
access a block diagram model comprising a plurality of graphical elements, the block diagram model provided in a modeling environment for simulation of a represented dynamic system;
provide source code from the block diagram model, where:
   the source code implements functionality specified by the block diagram model,
   the source code is in a textual programming language,
   the source code includes one or more comments, and
   the one or more comments provide information identifying a corresponding element in the block diagram model; and
generate a code generation report from the source code, the generating of the code generation report comprising:
   including the source code in the code generation report;
   parsing the one or more comments in the source code to identify the information, and
   replacing the information in the comment in the source code in the code generation report with a hyperlink relating to the corresponding element in the block diagram model, the hyperlink comprising an anchor and a reference to the corresponding element in the block diagram model, the hyperlink enabling direct navigation to the corresponding element in the block diagram model from the code generation report when the hyperlink is selected.

10. The medium of claim 9 wherein the computer readable medium is a random access memory (RAM).

11. The medium of claim 9 wherein the computer readable medium is a read only memory (ROM).

12. The medium of claim 9 wherein the computer readable medium is a hard disk.

13. A computing system comprising:
a non-transitory storage medium storing a block diagram model comprising a plurality of graphical elements, the block diagram model provided in a modeling environment for simulation of a represented dynamic system; and
a processor configured to:
   provide source code in a second language from a source model representation of the block diagram model, where:
      the source model representation of the block diagram model is provided in a first language,
      the second language is distinct from the first language,
      the generated source code includes one or more comments, and
      the one or more comments provide information identifying a corresponding element in the block diagram model;
   generate a code generation report from the generated source code, the generating of the code generation report comprising:
      including the source code in the code generation report;
      parsing the one or more comments in the generated source code to identify the information, and
      replacing the information in the one or more comments in the source code in the code generation report with a hyperlink relating to the corresponding element in the block diagram model, the hyperlink having an anchor and a reference to the corresponding element in the block diagram model, the hyperlink enabling direct navigation to the corresponding element in the block diagram model from the code generation report when the hyperlink is selected; and store the code generation report in the non-transitory storage medium.

14. The system of claim 13 wherein the processor and the non-transitory storage medium are incorporated into a network server capable of Internet communication.

15. An electronic device implemented method comprising:
- accessing a block diagram model in a modeling environment for simulation of a represented dynamic system; and
- generating, from a source model representation of the block diagram model, source code in a second language, where:
  - the source model representation of the block diagram model is provided in a source model language;
  - the second language is distinct from the source model language and is a textual programming language, and
  - the source code represents a functionality of the block diagram model,
- the generating comprising:
  - generating a portion of code for a section of the source model representation,
  - identifying an element in the block diagram model that corresponds to the portion of code, the element related to the section of the source model representation, and
  - generating a comment, the comment including a path identifying the section of the source model representation.

* * * * *